United States Patent
Izumi et al.

[11] Patent Number: 6,137,553
[45] Date of Patent: Oct. 24, 2000

[54] DISPLAY DEVICE AND MANUFACTURING METHOD THEREOF

[75] Inventors: Yoshihiro Izumi, Kashihara; Mutsumi Nakajima, Nara, both of Japan

[73] Assignee: Sharp Kabushiki Kaisha, Osaka, Japan

[21] Appl. No.: 09/167,037

[22] Filed: Oct. 5, 1998

[30] Foreign Application Priority Data

Oct. 8, 1997 [JP] Japan .................................. 9-275512

[51] Int. Cl.⁷ .............................. H01J 1/62; H01J 63/04; G02F 1/135; G02F 1/136
[52] U.S. Cl. .............................. 349/49; 313/506; 445/24; 349/90
[58] Field of Search ..................... 313/491, 498, 313/499, 501, 506, 507, 581, 582, 586, 587, 484; 445/24; 349/49, 41; 345/90, 97, 205

[56] References Cited

U.S. PATENT DOCUMENTS 5,227,900  7/1993  Inaba et al. ................... 359/56
5,986,724  11/1999  Akiyama et al. ............... 349/41

FOREIGN PATENT DOCUMENTS 64-4721   1/1989  Japan .
64-17025  2/1989  Japan .

OTHER PUBLICATIONS

"Amorphous Thin Films of Ferroelectric Oxides", Ren Xu, et al., SPIE vol. 1758 Sol–Gel Optics (1992), pp. 261–273.

"A New Two–Terminal Device Using Ferroelectric Polymetric Thin Film for Large–Area LCDs", Takashi Sato, et al., SID 91 DIGEST, pp. 18–21. May 1991.

Primary Examiner—Nimeshkumar D. Patel
Assistant Examiner—Michael J. Smith
Attorney, Agent, or Firm—Dike, Bronstein, Roberts & Cushman, LLP; David G. Conlin

[57] ABSTRACT

A display device includes a non-linear element including an inorganic ferroelectric material in a polycrystalline state and a display medium driven through the non-linear element.

8 Claims, 6 Drawing Sheets

DISPLAY DEVICE AND MANUFACTURING METHOD THEREOF

BACKGROUND OF THE INVENTION

1. Field of the Invention

The present invention relates generally to display devices, and more particularly, to improvements in the contrast and reliability of a passive matrix display device.

2. Description of the Background Art

Among display devices having a matrix arrangement, liquid crystal display devices, for example, may be largely divided into passive matrix type devices and active matrix type devices depending upon the driving method. The passive matrix type devices without any active element is simple in structure and less restricted in the manufacturing process, and therefore can be manufactured inexpensively. If, however, nematic liquid crystal which reacts to effective voltage is used in a passive matrix type device, cross talk could be caused between adjacent pixels, and since the pixels are displayed in a dynamic display mode, the contrast is generally low.

Meanwhile, in the active matrix type devices, each pixel is provided with an active element such as transistor, which performs switching operations, and therefore cross talk is restrained. Also in the active matrix type devices, since the pixels are displayed in a static display mode, high contrast generally results. However, an active element should be formed for each pixel, which results in a low yield, and many restrictions exist in the manufacturing process.

As disclosed by Japanese Patent Laying-Open Nos. 64-4721 and 64-17025, the use of a ferroelectric element having spontaneous polarization in a passive matrix type display device of a simple structure has been proposed to provide a display device of a relatively simple structure which could implement high contrast image display.

FIGS. 6B and 6A schematically show one pixel included in a passive matrix type liquid crystal display device disclosed in Japanese Patent Laying-Open No. 64-4721. FIG. 6A is a plan view, and FIG. 6B is a cross sectional view taken along line 6B—6B in FIG. 6A.

In this display device, a first signal electrode 23 of Cr is formed on an upper surface of a lower glass substrate 21. First signal electrode 23 and lower glass substrate 21 are covered with a ferroelectric layer 24 having spontaneous polarization and comprised of amorphous $TiBaO_3$. To provide a pixel region, a pixel electrode 25 of a transparent ITO (indium-tin oxide) film is formed on ferroelectric layer 24, partially lying over first signal electrode 23. Meanwhile, a second signal electrode 26 of an ITO film is formed on a lower surface of an upper glass substrate 22. A liquid crystal layer 27 is held between lower and upper substrates 21 and 22.

FIG. 7 is an equivalent circuit diagram of a display device having a plurality of pixels arranged in a matrix, each of which is as shown in FIGS. 6A and 6B. In the equivalent circuit diagram, a liquid crystal capacitor 30 and a ferroelectric capacitor 31 are connected in series between a bus line 28 for scanning electrodes in the X-direction and a bus line 29 for data electrodes in the Y-direction. More specifically, first signal electrode 23 corresponds to data electrode 29, and second signal electrode 26 corresponds to scanning electrode 28. Liquid crystal layer 27 and ferroelectric layer 24 correspond to capacitors 30 and 31, respectively.

The ferroelectric capacitor generally exhibits the electrical characteristic where voltage applied (field intensity) and capacitance (load) have a non-linear relation and may therefore serve as a so-called non-linear element. More specifically, if a signal voltage equal to or higher than a threshold value is applied between the bus lines in the X- and Y-directions at the selection of a pixel, the ferroelectric film spontaneously polarizes, such that electric charges may be generated to charge the liquid crystal capacitor. In a pixel selected in one frame, the ferroelectric film has a memory function holding the spontaneous polarization, which permits the charges given to the liquid crystal capacitor to be held until the pixel is reselected in the next frame. As a result, higher contrast image display with less cross talk is enabled as compared to the conventional passive matrix type liquid crystal display device.

However, a glass substrate is generally used as the substrate of such a display, because the substrate is desirably transparent and inexpensive, and has a sufficient area. The use of the glass substrate is however encountered with the following disadvantage.

When we refer to the manufacture of a ferroelectric element usually used as a non-volatile memory on a silicon substrate, for example, a ferroelectric film of an inorganic material such as PZT (lead zirconate titanate) is formed into an amorphous state by means of a sputtering or sol-gel method, then is annealed at a temperature of about 600° C. or higher for crystallization, and the crystallization provides enough ferroelectric characteristic and reliability to the device. In connection with this, the difference in the ferroelectric characteristic between crystallized PZT and amorphous PZT is described, for example, in SPIE, Vol. 1758, Sol-Gel Optics (1992), pp. 261–273. More specifically, the document clearly indicates that the residual dielectric polarization in the amorphous PZT annealed at a temperature of 400° C. is 3.2 $\mu C/cm^2$, while that in the crystallized PZT annealed at a temperature of 700° C. is 31.5 $\mu C/cm^2$, which is improvement by one order of magnitude in the characteristic.

However, the glass substrate is used in the display as described above, and glass has a softening temperature far lower than silicon. Therefore, it is difficult to crystallize an inorganic ferroelectric film in an amorphous state by annealing at a temperature of about 600° C. or higher on the glass substrate. As a result, an inorganic ferroelectric film having sufficient ferroelectric characteristic and reliability cannot be obtained on such a glass substrate, and the display including the inorganic ferroelectric capacitor as described above has not been yet reduced to practice.

Meanwhile, Japanese Patent Laying-Open No. 64-17025 discloses the use of a film comprised of a copolymer P (VDF/TrFE) of vinylidene fluoride (VDF) and trifluoroethylene (TrFE), both ferroelectric polymers, in place of a ferroelectric film of an inorganic material. Since the P (VDF/TrFE) film may be spin-coated and thereafter crystallized by annealing at a temperature of about 150° C., an organic ferroelectric film may be easily formed on a glass substrate. The actual use of such a P (VDF/TrFE) film formed on a glass substrate for fabricating a display device is reported in SID 91 DIGEST, pp. 18–20 (1991).

Now, in an organic ferroelectric film, dipoles coupled to a principal chain forming a polymer are oriented to cause spontaneous polarization, while the principal chain itself changes its state or rotates at this time. The organic ferroelectric film is changeable in the crystal state and is disadvantageously unreliable, and therefore such a display device using the organic ferroelectric film has not yet been reduced to practice. Note that the inorganic ferroelectric film generates spontaneous polarization as the loaded atoms are displaced even for a small distance, and therefore the film has relatively higher reliability than the organic ferroelectric film.

SUMMARY OF THE INVENTION

In view of the above described conventional cases, it is an object of the present invention to provide a high contrast, highly reliable passive matrix type display device and yet less costly, a device which permits an inorganic ferroelectric film with sufficient ferroelectric characteristic and reliability to form, even if a glass substrate is used.

A display device according to one aspect of the present invention includes a non-linear element including an inorganic ferroelectric material in a polycrystalline state, and a display medium driven through the non-linear element. Since the display device is driven through the non-linear element including the polycrystalline inorganic ferroelectric material, which generates enough spontaneous polarization, high display quality and reliability are secured.

According to another aspect of the present invention, a method of manufacturing a display device including a non-linear element including a film of an inorganic ferroelectric material in a polycrystalline state, and a display medium driven through the non-linear element includes the steps of forming an amorphous film comprised of an inorganic ferroelectric material, and irradiating light to the amorphous film to obtain a film of an inorganic ferroelectric material in a polycrystalline state. Therefore, the irradiated light is absorbed through the surface of the ferroelectric film, and the absorbed amount of light attenuates exponentially along the thickness-wise direction of the ferroelectric film, so that the energy may be efficiently applied only to the ferroelectric film. Stated differently, the ferroelectric film can be efficiently crystallized while limiting the temperature rise of the lower layer of the ferroelectric film to lower than 600° C. As a result, a ferroelectric film may be crystallized without any problem on an inexpensive glass substrate having a heat-resisting temperature of about 600° C.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
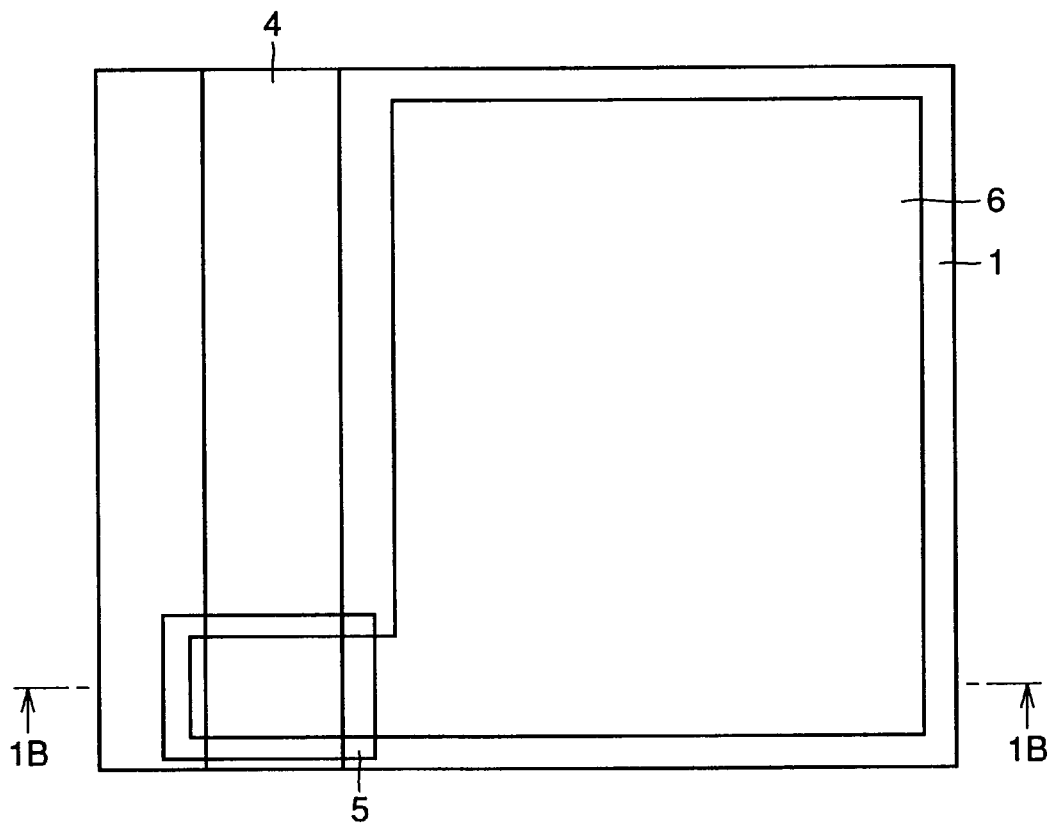
FIG. 1A is a schematic plan view of one pixel included in a display device according to one embodiment of the invention.
Figure 1B:
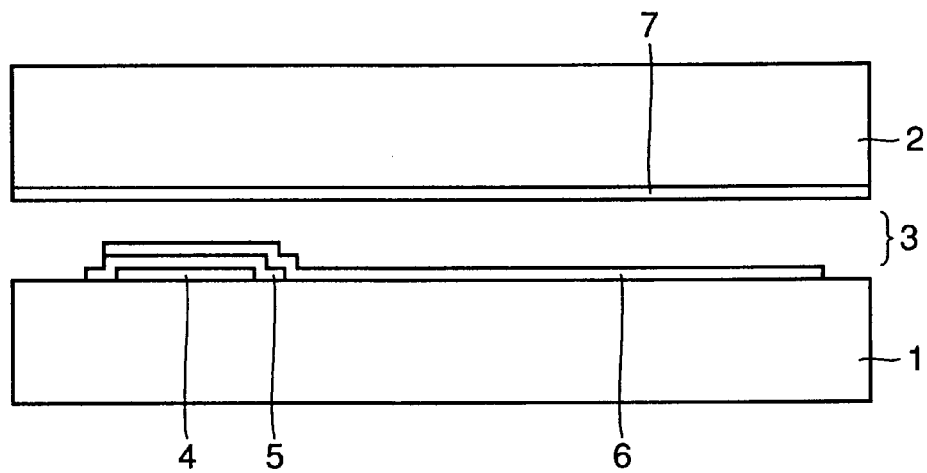
FIG. 1B is a cross sectional view taken along line 1B—1B in FIG. 1A.

FIGS. 1A and 1B schematically show one pixel included in a passive matrix type liquid crystal display device according to one embodiment of the present invention. FIG. 1A is a plan view, and FIG. 1B is a cross sectional view taken along line 1B—1B in FIG. 1A.

In this display device, a data electrode 4 of a tantalum (Ta) film is provided on an upper surface of a lower glass substrate 1. A part of data electrode 4 is covered with a ferroelectric film 5 comprised of PZT in a polycrystalline state. To provide a pixel region, a pixel electrode 6 of a transparent ITO film is also formed on lower glass substrate 1, partially lying over data electrode 4 through ferroelectric film 5. Meanwhile, a scanning electrode 7 of an ITO film is formed on the lower surface of glass substrate 2. A liquid crystal layer 3 is held between lower substrate 1 and upper substrate 2.

Figure 2:
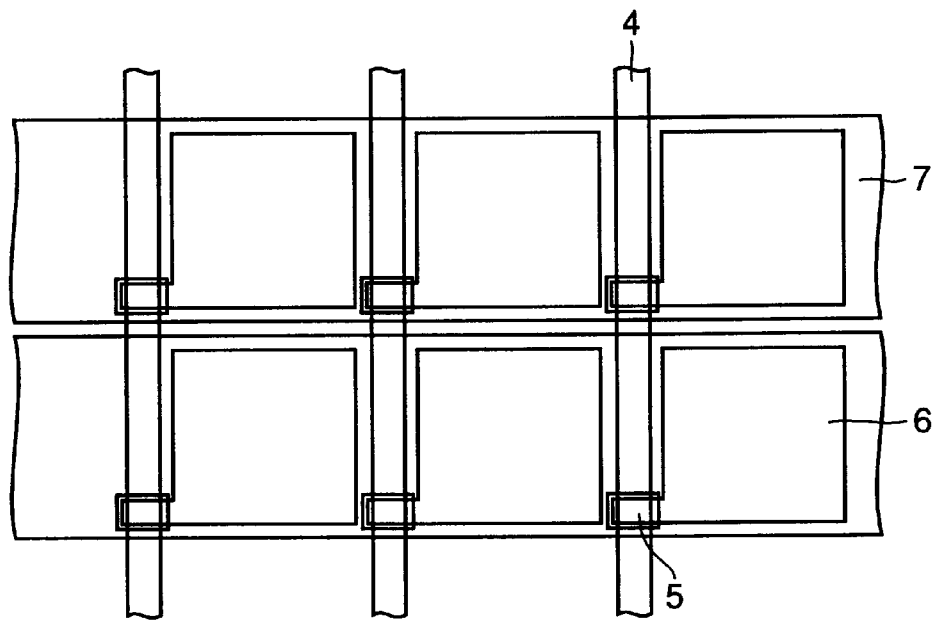
FIG. 2 is a schematic plan view of a display device in which a plurality of pixels as shown in FIG. 1A are arranged in a matrix.

FIG. 2 is a schematic plan view of a display device in which a plurality of pixels as shown in FIG. 1A are arranged in a matrix. As shown in FIG. 2, scanning electrode 7 and data electrode 4 are arranged orthogonal to each other. Scanning electrode 7 is also provided to function as an opposite electrode to pixel electrode 6 connected to data electrode 4 through ferroelectric film 5.

Figure 3:
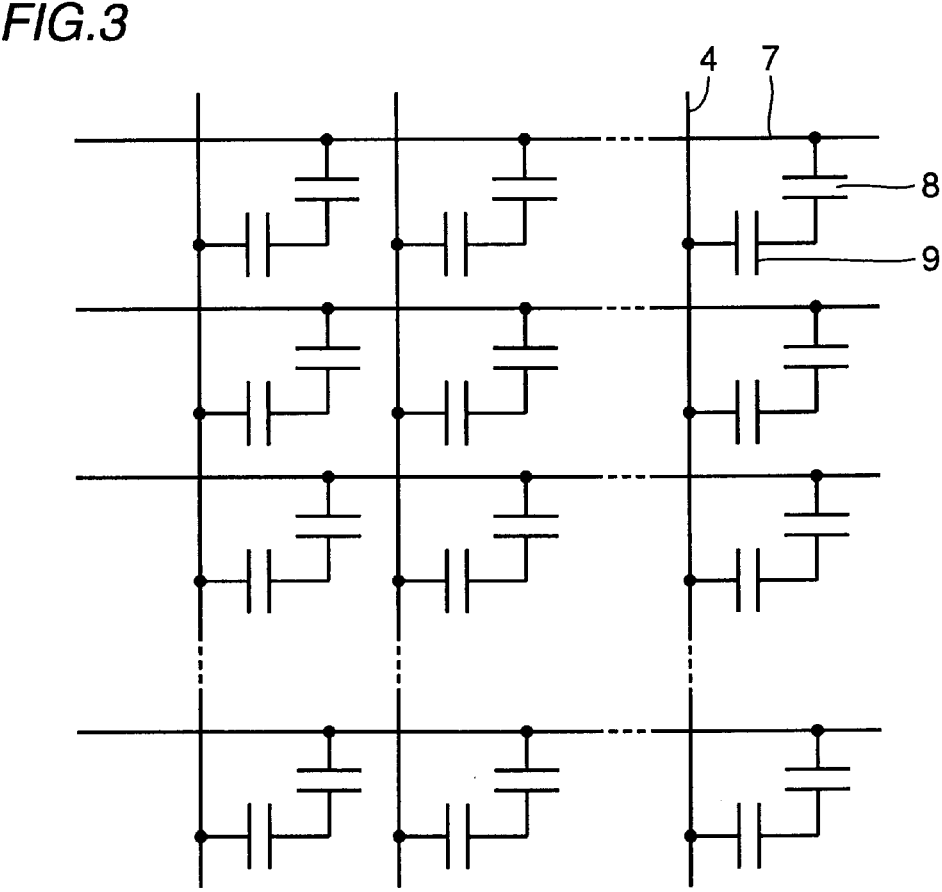
FIG. 3 is an equivalent circuit diagram of the display device shown in FIG. 2.

FIG. 3 is an equivalent circuit diagram of the display device shown in FIG. 2. In each pixel, a liquid crystal capacitor 8 as a display medium and a ferroelectric film capacitor 9 are connected in series between data electrode 4 and scanning electrode 7. Ferroelectric film 5 generates spontaneous polarization once the intensity of an externally applied electric field exceeds a threshold value, as well known in this field of art. The thus generated spontaneous polarization is maintained until a field of an intensity higher than the threshold value in the opposite polarity is applied, i.e., a memory function exists. More specifically, ferroelectric capacitor 9 serves as a non-linear element. As a result, liquid crystal capacitor 8 connected in series to ferroelectric capacitor 9 may be charged by charges generated by the spontaneous polarization of ferroelectric film 5. The charges given to liquid crystal capacitor 8 are maintained by the function of the memory function of ferroelectric capacitor 9. The display device shown in FIG. 2 can be driven, taking advantage of this principle. Note that as can be seen from the equivalent circuit diagram in FIG. 3, the display device may be similarly driven if scanning electrode 7 and data electrode 4 are replaced with each other.

In the display device according to the present invention taking advantage of the spontaneous polarization of ferroelectric film and the memory function thereof, cross talk between adjacent pixels is reduced and high contrast is implemented as compared to a conventional passive matrix type display device. The display device according to the present invention is also advantageous over a conventional active matrix type display device using a TFT for its simple structure and good productivity.

FIGS. 4A to 4E show an example of the manufacturing process of the pixel shown in FIG. 1B.

Figure 4A:
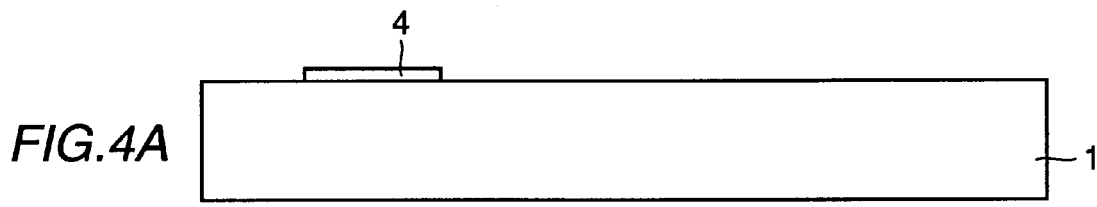
FIGS. 4A to 4E are cross sectional views for use in illustration of the manufacturing process of the pixel shown in FIG. 1B.

As shown in FIG. 4A, a Ta film having a thickness of 0.3 μm is, for example, deposited on #1737 transparent glass substrate 1 available from the Corning Corporation by means of sputtering. The Ta film is patterned by photolithography and dry etching to form data electrode 4.

Figure 4B:
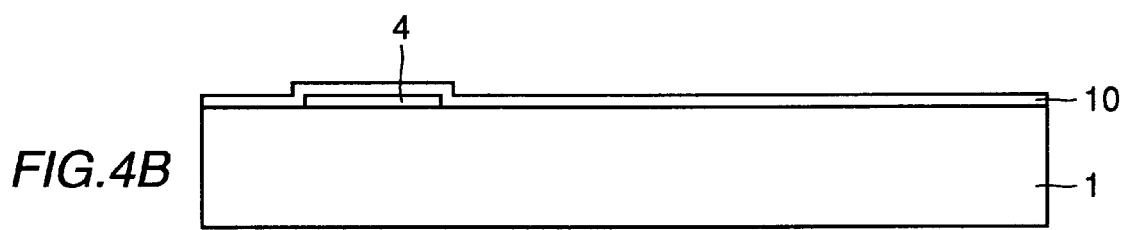

In FIG. 4B, an amorphous ferroelectric film 10 mainly comprised of Pb, Zr, Ti and O and having a thickness of about 0.5 μm is deposited to cover data electrode 4 and substrate 1 for example by means of high frequency magnetron sputtering using $Pb_{1.1}(Zr_{0.5} Ti_{0.5}) O_{3.1}$ excessively containing PbO by 10% as a target. Amorphous ferroelectric film 10 is to be transformed to lead zirconate titanate Pb $(Zr_{0.5} Ti_{0.5}) O_3$, in other words, to PZT. Note that the residual dielectric polarization of such amorphous PZT film 10 is about 2 $\mu C/cm^2$.

Figure 4C:
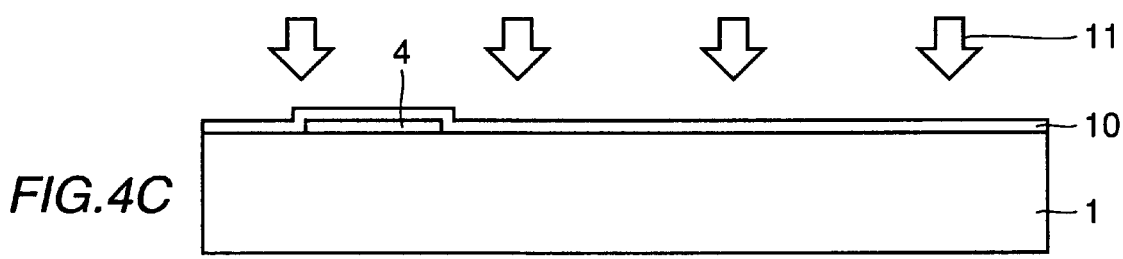

In FIG. 4C, a XeCl excimer laser beam 11 is vertically directed to amorphous ferroelectric film 10. At this time, XeCl excimer laser beam 11 is an ultraviolet beam having a wavelength of 308 nm and since the absorption end of PZT is within the range from 500 to 600 nm, amorphous ferroelectric film 10 is rapidly heated by absorbing excimer laser beam 11 and crystallized. Excimer laser beam 11 is irradiated for example for about 0.6 second at an energy density of 500 $mJ/cm^2$ in an oxygen atmosphere, using a laser oscillator having an output power of 10 W at a pulse cycle of 20 Hz.

As a result, amorphous PZT film 10 is transformed into a polycrystalline film having a perovskite crystal structure. The thus obtained polycrystalline PZT film is a very dense film having a crystal grain size of about 30nm, and can have a residual dielectric polarization of about 25 $\mu C/cm^2$. Note that a general purpose laser annealing device for forming polycrystalline Si-TFT for a liquid crystal display device may be used herein, and using the optical system thereof, amorphous PZT film 10 may be scanned with a laser beam of a square cross section having one side of several centimeters.

Figure 4D:
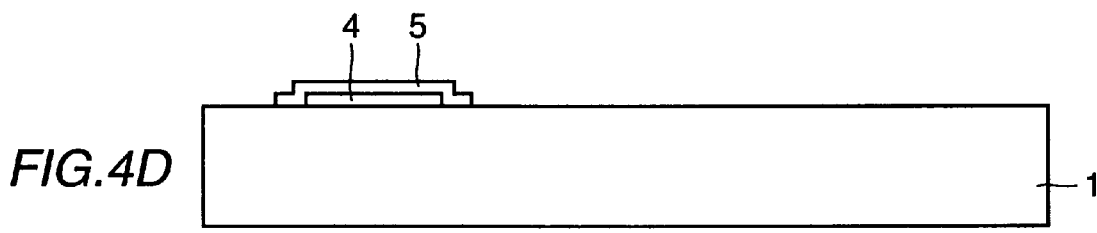

In FIG. 4D, the polycrystalline PZT film crystallized by means of laser annealing is patterned into a ferroelectric film 5 having a desired shape and a desired region.

Figure 4E:
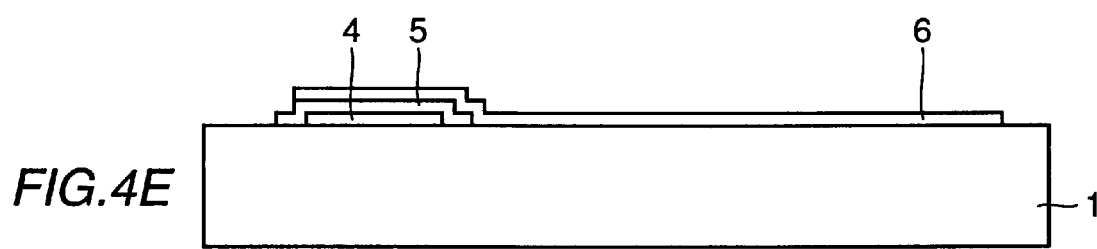

In FIG. 4E, a transparent conductive ITO film is deposited to have a thickness of about 0.15 μm by means of sputtering to cover the entire surface of the upper side of substrate 1. The ITO film is patterned into a pixel electrode 6 having a desired shape and a desired region by means of photolithography and dry etching.

Meanwhile, as shown in FIG. 1B, an ITO film having a thickness of about 0.3 μm is deposited by means of sputtering on the lower surface of upper substrate 2 for example of the #1737 transparent glass for a liquid crystal panel available from the Corning Corporation. The ITO film is subjected to photolithography and dry etching to form scanning electrode 7 having a desired pattern.

An orientation film (not shown) for orienting crystal 3 is applied on the opposing surfaces of a pair of the thus obtained glass substrates 1 and 2 as shown in FIG. 1B. This orientation film may be formed by applying a polyimide film having a thickness of about 0.05 μm by a printing method, followed by annealing, and orienting by rubbing. Thereafter, a liquid crystal layer 3 is enclosed between the pair of glass substrates 1 and 2 to complete a display device according to the embodiment of the present invention. Note that the polarization characteristic of liquid crystal 3 is used for a display mode, a polarizing plate is preferably provided on each of the outer surfaces of the pair of glass substrates 1 and 2.

Since a PZT film in a polycrystalline state is used as ferroelectric film 5, the display device according to the above embodiment may be driven in high contrast free from cross talk, taking advantage of the ferroelectric characteristic higher than the amorphous PZT film. For example, the residual dielectric polarization of the amorphous PZT film is about 2 $\mu C/cm^2$, while that of the polycrystalline PZT film may be increased to about 25 $\mu C/cm^2$.

If the residual dielectric polarization of ferroelectric film 5 is X times as much, the effective area may be reduced to 1/X and still the same load by spontaneous polarization may be provided. More specifically, if the residual dielectric polarization increases from 2 $\mu C/cm^2$ to 25 $\mu C/cm^2$, the effective area of ferroelectric film 5 may be 2/25 as large. As the area of ferroelectric film 5 is reduced, the area of pixel electrode increases, so that the area density of the pixels included in the display device can be increased.

Furthermore, as compared to an amorphous ferroelectric film, a crystalline ferroelectric film less suffers from deterioration in the characteristic caused by the repetition of spontaneous polarization, and therefore a more reliable display device may be provided.

In the display device according to the above embodiment, glass substrate 1 is used as a substrate supporting ferroelectric film 5. Conventionally, in order to crystallize an inorganic ferroelectric film, annealing at a temperature as high as 600° C. or higher is performed. If a non-volatile memory is manufactured using the inorganic ferroelectric film, a silicon substrate or the like having a high melting point such as a Si wafer is normally used, and no problem is encountered in the annealing process at high temperatures. However, since the display device must use a transparent, large area glass substrate in place of such a Si wafer, a heat treatment at a temperature of 600° C. or higher cannot be performed, and the inorganic ferroelectric film is hardly crystallized.

Therefore, a laser annealing method is employed as means for crystallizing the ferroelectric film as described above. The ultraviolet laser beam has its penetration length limited to about the thickness of the ferroelectric film, and therefore the substrate can be efficiently crystallized without being undesirably heated. More specifically, an amorphous ferroelectric film may be crystallized without any problem on an inexpensive glass substrate having a heat-resisting temperature of about 600° C., so that a high contrast, large area display device may be provided less costly.

Conventionally, when an inorganic ferroelectric film is crystallized, annealing at a temperature of 600° C. or higher is performed in an atmosphere containing oxygen. In an oxygen containing atmosphere, most of the metals are oxidized at a temperature of 600° C. or higher. As a result, if a conductive signal line should be provided under the ferroelectric film, a signal line comprised of a rare metal such as Pt and Ir which are both hardly oxidized at 600° C. or a rare metal oxide such as $RuO_2$ and $IrO_2$ is used, which results in increase in the cost.

However, according to the present invention, the laser annealing method permits efficient crystallization of ferroelectric film 5 without heating data electrode 4 to a high temperature. As a result, various metals other than the rare metals or rare metal oxides may be used as a material for forming data electrode 4. In practice, a Ta film which was relatively hard to be oxidized was used for data electrode 4, and it was confirmed that the Ta film was actually almost hardly oxidized during laser annealing, and that the film could be sufficiently used as data electrode 4. It is understood that the material of data electrode 4 is not limited to Ta, and any conductive material may be used as long as the material can maintain enough conductivity after ferroelectric film 5 is laser-annealed in an atmosphere containing oxygen.

In the embodiment shown in FIGS. 4A and 4E, amorphous PZT film 10 is crystallized by laser annealing, and then patterned. It is however understood that amorphous PZT film 10 may be patterned and then crystallized by means of laser annealing. The ultraviolet beam used for the laser annealing is not limited to the XeCl excimer laser beam, and an excimer laser such as ArCl, ArF, KrCl, KrF, XeBr, and XeF having a wavelength included in the absorbent of ferroelectric film 10. Alternatively, an ultraviolet beam from a hydrogen discharge tube, a mercury lamp, a Xe lamp or the like may be used.

Furthermore, the method of forming amorphous ferroelectric film 10 is not limited to the high frequency magnetron sputtering, and a sol-gel method or MOCVD may be employed. In addition, ferroelectric film 5 may be formed not only by PZT, but also by a ferroelectric material such as $SrBi_2Ta_2O_9$, $PbTiO_3$, $KNbO_3$, and $Pb(MnNb)O_3$, and if desired, an impurity such as lanthanum (La), calcium (Ca), niobium (Nb), neodium (Nd), bismuth (Bi), antimony (Sb), and tantalum (Ta) may be doped. Note however that an optical source used for crystallizing a ferroelectric film should be selected by considering the relation of the absorbent of the ferroelectric material and the wavelength of the irradiated light.

Furthermore, the present invention is applicable not only to a liquid crystal display device using liquid crystal as a display medium, but also to display devices such as an electrochromic display device, and an electrophoretic display device using other display media.

Figure 5A:
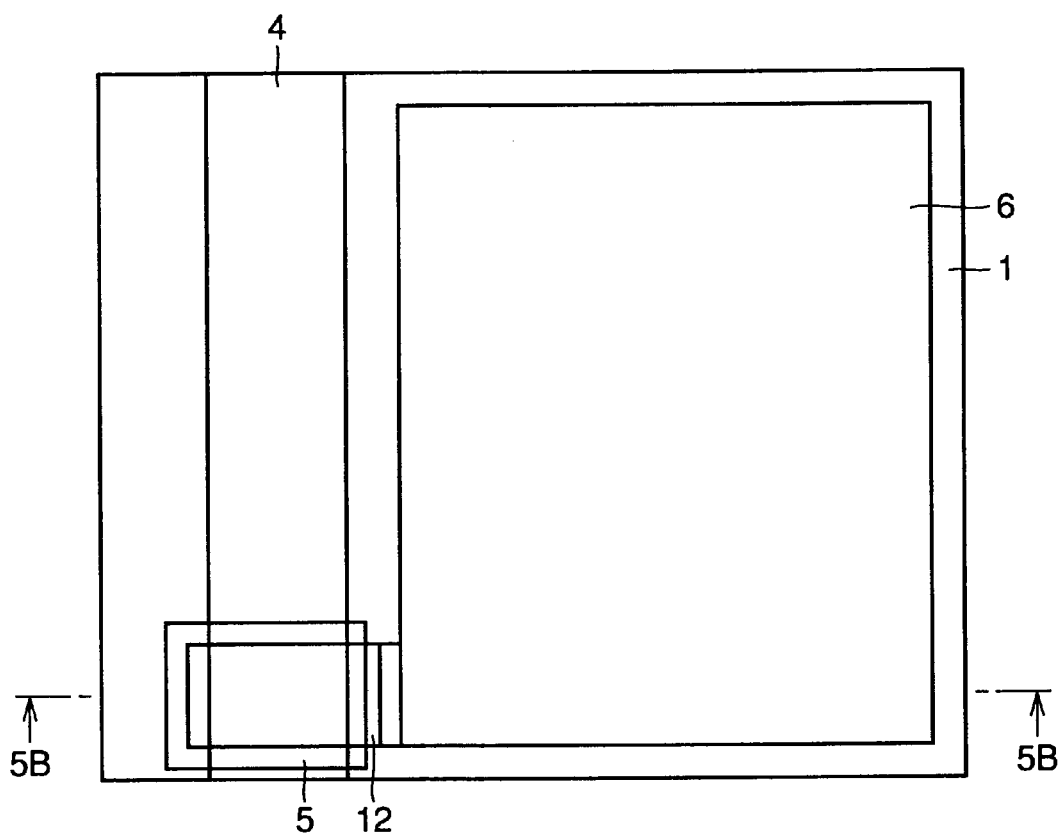
FIG. 5A is a schematic plan view of one pixel included in a display device according to another embodiment of the invention.
Figure 5B:
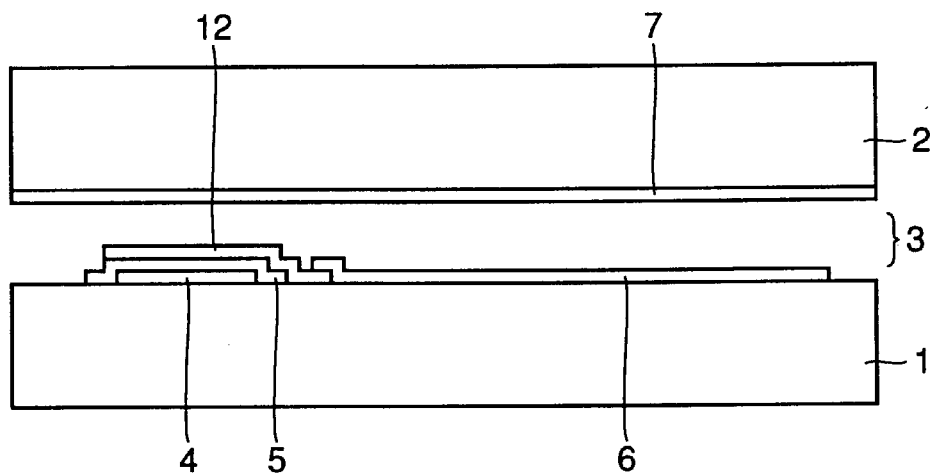
FIG. 5B is a cross sectional view taken along line 5B—5B in FIG. 5A.
Figure 6A:
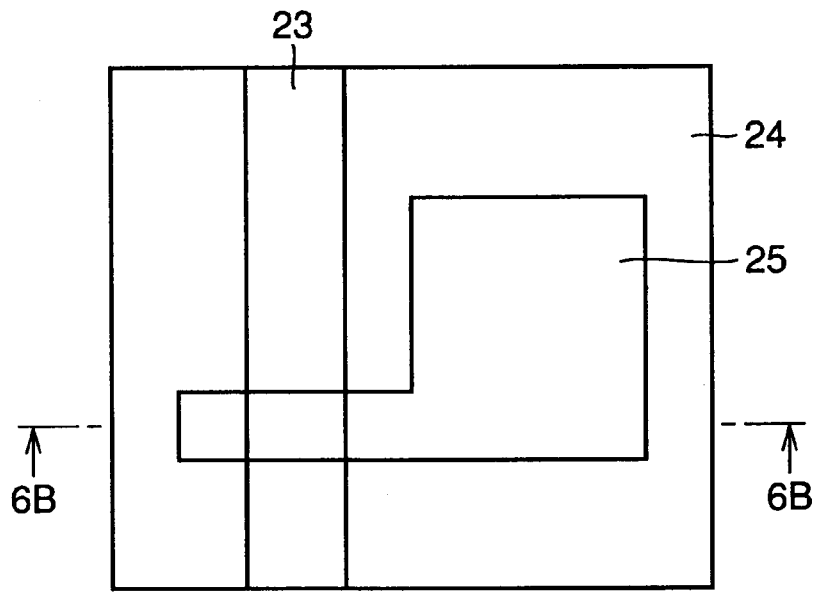
FIG. 6A is a plan view of one pixel included in a conventional display device.
Figure 6B:
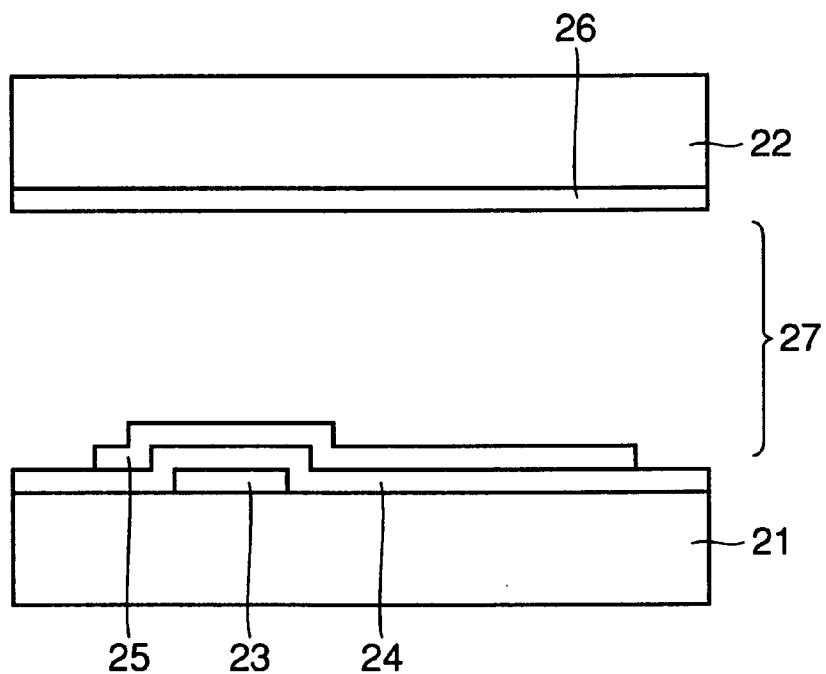
FIG. 6B is a cross sectional view taken along line 6A—6A in FIG. 6A.
Figure 7:
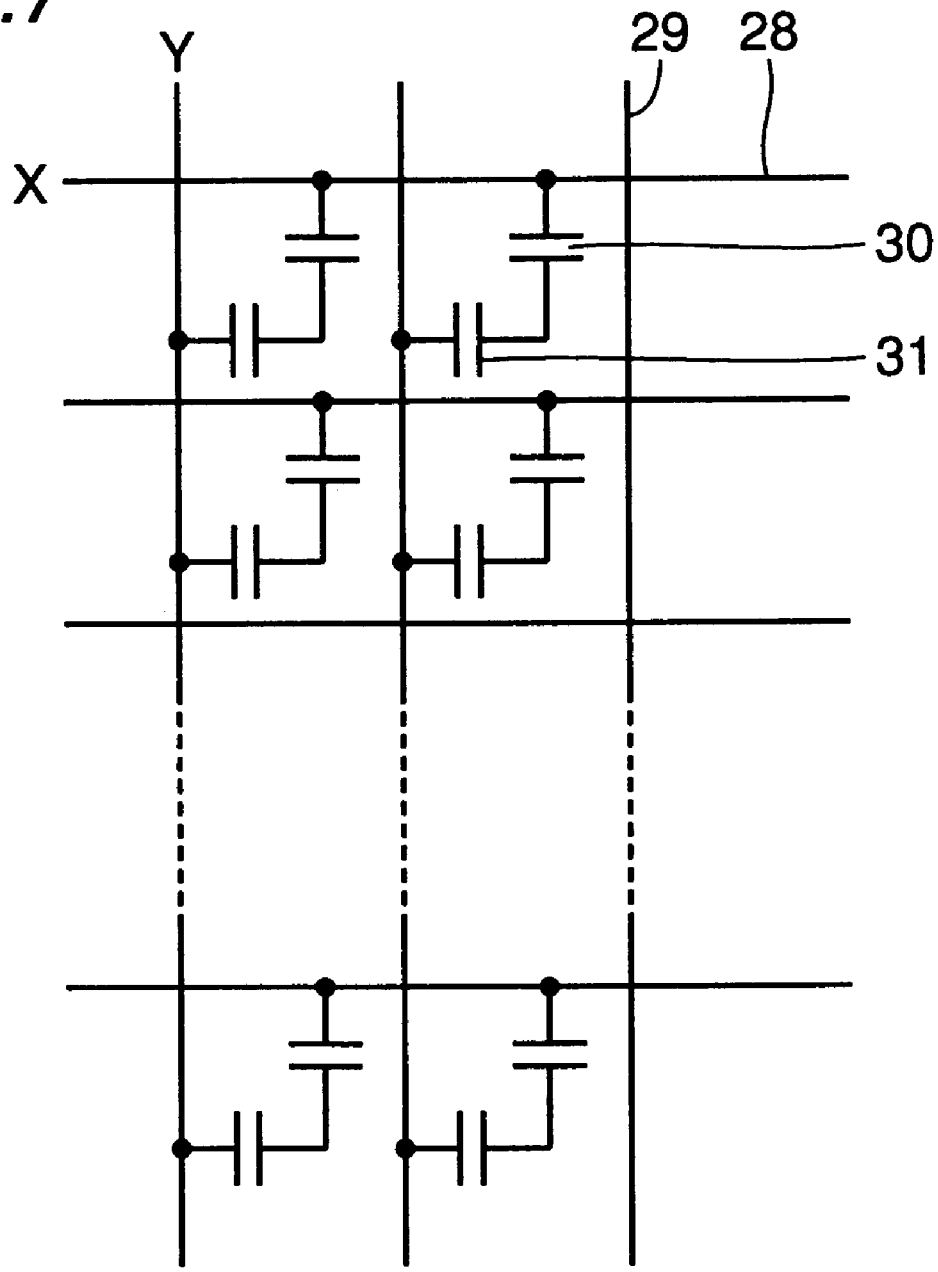
FIG. 7 is an equivalent circuit diagram of a display device in which a plurality of pixels as shown in FIG. 6A are arranged in a matrix.

FIGS. 5A and 5B schematically show one pixel included in a liquid crystal display device according to another embodiment of the present invention. FIG. 5A is a plan view, and FIG. 5B is a cross sectional view taken along line 5B—5B in FIG. 5A.

The pixel shown in FIGS. 5A and 5B is similar to that shown in FIGS. 1A and 1B, except that an upper electrode 12 covering ferroelectric film 5 is formed by a different material from pixel electrode 6. More specifically, pixel electrode 6 itself is connected to upper electrode 12 and does not cover the ferroelectric film, while upper electrode 12 covering ferroelectric film 5 is formed by the same material as that of data electrode 4 under ferroelectric film 5.

Therefore, the contact resistances generated at the upper and lower interfaces to ferroelectric film 5 are the same, and symmetric electrical characteristics may be provided in response to electric fields of both negative and positive polarities to be applied to ferroelectric film 5. More specifically, symmetric hysteresis characteristic in residual dielectric polarization results in response to the inversion of the direction of the electric field applied to ferroelectric film 5.

In general, if a DC voltage is constantly applied to a display medium such as liquid crystal, the liquid crystal material may decompose or ions may be adsorbed to the electrodes, and the reliability of the display device is hardly secured. Therefore, an AC driving method in which the polarity in each pixel is inverted between frames preferably employed for driving the display device. Herein, if the electric characteristics of ferroelectric film 5 at the upper and lower interfaces are symmetric relative to the inversion of the polarity of the electric field applied as described above, such AC driving may be performed accurately.

More specifically, if the ferroelectric film exhibits an asymmetric hysteresis characteristic relative to the residual dielectric polarization in response to the inversion of the electric field polarity affected by the asymmetricalness of the upper and lower interfaces thereof, a signal to correct the asymmetricalness should be added to the driving signal. In the embodiment shown in FIG. 5B, however, since the upper and lower interfaces of ferroelectric film 5 have the same electric characteristic and the residual dielectric polarization has a symmetric hysteresis characteristic in response to the inversion of the polarity of the electric field, the correction signal does not have to be added to the AC driving signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device, comprising:

a non-linear element including an inorganic ferroelectric material in a polycrystalline state; and a display medium driven through said non-linear element.

2. The display device as recited in claim 1, wherein said non-linear element and said display medium are provided between a pair of insulative substrates.

3. The display device as recited in claim 1, wherein said non-linear element is formed on a glass substrate.

4. The display device as recited in claim 1, wherein said non-linear element is connected to two electrodes including a conductive material other than a rare metal or an oxide thereof.

5. The display device as recited in claim 1, wherein said non-linear element is connected to two electrodes comprised of the same conductive material.

6. The display device as recited in claim 1, wherein said display medium includes liquid crystal.

7. A method of manufacturing a display device comprising a non-linear element including a film of an inorganic ferroelectric material in a polycrystalline state and a display medium driven through said non-linear element, comprising the steps of:

forming an amorphous film of said ferroelectric material; and directing light to said amorphous film to obtain said film of the inorganic ferroelectric material in the polycrystalline state.

8. The method as recited in claim 7, wherein said light is an excimer laser beam.

* * * * *